United States Patent [19]

Mahrus et al.

[11] Patent Number: 4,461,585
[45] Date of Patent: Jul. 24, 1984

[54] SLEEVE BEARING COMPOSED OF HALFSHELLS HAVING DIFFERENT ECCENTRICITIES

[75] Inventors: Duraid Mahrus; Antonio P. Lourenco, both of São Paulo, Brazil

[73] Assignee: Metal Leve S.A., Brazil

[21] Appl. No.: 451,410

[22] Filed: Dec. 20, 1982

[30] Foreign Application Priority Data

Dec. 23, 1981 [BR] Brazil ............................ 8108360

[51] Int. Cl.³ ........................................... F16C 33/04
[52] U.S. Cl. .................................. 384/288; 384/430
[58] Field of Search .............. 384/114, 129, 276, 286, 384/288, 294, 429–433; 123/193 P, 197 AB

[56] References Cited

U.S. PATENT DOCUMENTS 3,625,580 12/1971 DeHart ............................ 384/288
4,073,550 2/1978 Yahraus ........................... 384/288
4,235,481 11/1980 Fukuoka et al. .................. 384/431
4,307,921 12/1981 Roberts ........................... 384/399
4,311,349 1/1982 Roberts ........................... 384/288

FOREIGN PATENT DOCUMENTS 699249 11/1979 U.S.S.R. ........................... 384/430

Primary Examiner—Stuart S. Levy
Assistant Examiner—David Werner
Attorney, Agent, or Firm—Darby & Darby

[57] ABSTRACT

A sleeve bearing composed of a halfshell (20) installed in the connecting rod having a reduced or inexistent eccentricity, defining a substantially constant clearance between the halfshell and a journaled member (30), and a halfshell (21) installed in the connecting rod bearing cap having an eccentricity, defining between the halfshell and the journaled member (30), at the point corresponding to the halfshell centerline, a clearance equal to that between the halfshell (20) and the journaled member, the said clearance increasing from the centerline toward the parting line B.

6 Claims, 3 Drawing Figures

SLEEVE BEARING COMPOSED OF HALFSHELLS HAVING DIFFERENT ECCENTRICITIES

This invention relates to a sleeve bearing intended for use in four-stroke internal combustion engines, particularly as a connecting rod bearing.

As known by those skilled in the art, there is provided a clearance holding a film of lubricating oil between the inner peripheral surface of the bearing and the crankpin. According to the current technology concepts an adequate choice of the assembly clearance between the shaft and the bearing is made based on load and lubrication considerations, generally with the aid of computerized methods. In such studies, minimum and maximum amounts for these clearances are defined by key parameters such as the bearing operating temperature, minimum oil film thickness and maximum oil film pressure. Where the bearing-to-shaft clearance is reduced the oil film is subjected to a high shearing stress causing the sleeve bearings to overheat, besides facilitating a contact between the shaft and the bearing due to an excessively thin oil film. Under such conditions, the bearing material is subject to failure by overheating and excessive wear. Inversely, large clearances cause an excessive hydrodynamic pressure in conjunction with a reduction in the oil film thickness, thereby exposing the bearing material to fatigue failure and excessive wear. The numerical techniques currently employed afford a prediction of acceptable limits for assembly clearances based on the lubricating oil characteristics and the bearing geometry and materials.

The high-load four-stroke internal combustion engines designed according to current trends have subjected bearings, particularly the connecting rod bearings, to an excessive load and wear which become prohibitive and eventually cause fatigue and overheating problems. These engines, in which high operating speeds are combined with a low mass interest of every component, subject the connecting rods to high inertia loads thereby causing distortions on their big end hole during operation.

Due to the connecting rod configuration and the manner by which they transmit forces, the resulting distortions are such that during the exhaust stroke and, to a lesser degree, during the compression stroke the rod big end tends to have its diameter increased toward the centerline of the big end and small end holes, and reduced in a direction orthogonal to the said centerline. On the other hand, during the expansion stroke the big hole tends to have its diameter increased, or even unchanged, in a direction orthogonal to the connecting rod big end and small end centerline. The amounts of these diametral variations are dependent on the inertia loads acting on the connecting rods as well as the structural resistance of the rods which is related with both the quantity and the mass distribution in its design.

It is one particular object of the present invention to provide the means to render these distortions of the connecting rod big end hole less detrimental to the bearing performance. This purpose is attained by means of a new bearing design involving a particular configuration, with no consideration to aspects attendant to the referred to inertial loads and the connecting rod structural resistance.

According to the invention, one halfshell having a reduced or nonexistent eccentricity is inserted in the connecting rod big end, which is the portion subjected to expansion and beginning of exhaust loads, whereas the connecting rod bearing cap, which is the portion subjected to end of exhaust and beginning of intake loads, is provided with a halfshell having a greater or suitable eccentricity which values are a function of specific requirements of a given design.

The objectives and advantages of this invention are hereinafter described with reference to the accompanying drawings wherein.

Figure 1:
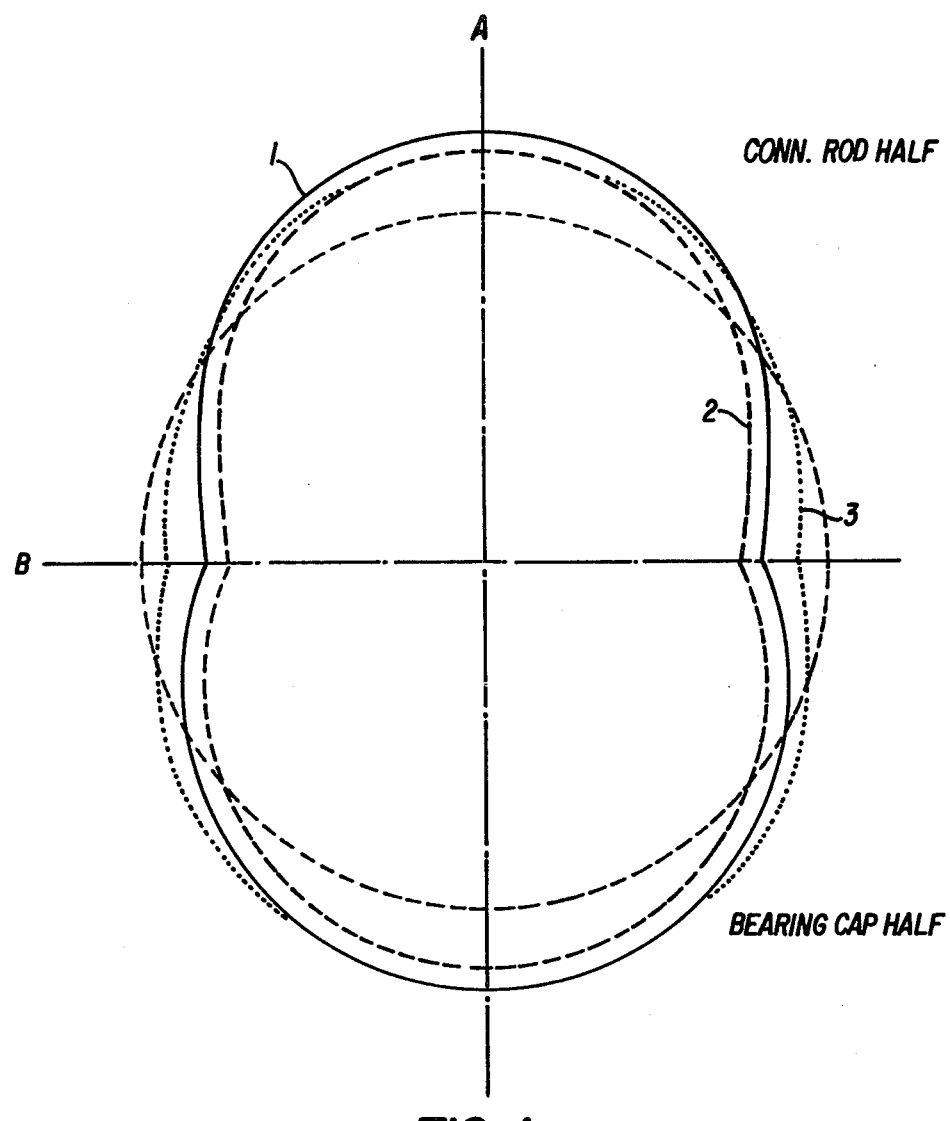
FIG. 1 is a schematic view of the shape taken by the connecting rod large end hole during the peak inertial load at exhaust.

In one specific case, defined in FIG. 1 by way of example for a diametral clearance of 0.100 mm, the closing of the connecting rod big end hole under load in a direction orthogonal to the centerline of the big and small end holes was 0.080 mm when subjected to the maximum inertia load. As according to conventional designs the halfshell has a substantially semi-circular configuration, the shape taken by the hole with the halfshell in place is similar to a empty hole. Line "1" shows the shape of the empty hole and line "2" depicts the shape of the hole with the circular halfshells in place.

The reduction in clearance (about 80 percent) in the direction of closing of the connecting rod hole causes disturbances for the creation of a stable lubricating oil film and a consequential increase of the operating temperature. Under such conditions, a bearing-to-journal contact may take place close to the point below the parting line with a subsequent failure of the bearing material caused by excessive wear and overheating. Owing to the instability or turbulence developed in the oil film this closing can further lead the bearing sliding surface to erosion damages caused by cavitation in the oil film.

In the aforesaid circumstances—closing of the hole under inertia load—one must increase the clearance in the direction of closing thereby enabling a stable lubricating oil film, thus preventing heat to be generated above levels determined beforehand.

Line "3" in FIG. 1 illustrates the shape taken by the distorted hole with a pair of halfshells having equal eccentricities in place, one in the rod and one in the bearing cap. This measure, an increase of the diametral clearance by the use of a pair of halfshells having equal eccentricities, although solving problems arising out of the closing of the rod big end hole subjected to inertia loads, can on the other hand give rise to problems on the bearing with eccentricity placed in the rod half during the expansion stroke. An excessive increase in the operating clearance may create a highly detrimental increase in the hydrodynamic pressure developed in the lubricating oil film, in conjunction with an equally detrimental decrease in the minimum oil film thickness. These two conditions may lead to an excessive wear or fatigue failure of the bearing material.

With a view to overcoming the disadvantages resulting from the use of bearings with eccentricity in four-stroke internal combustion engine connecting rods, where a significant amount of deformation of the big end hole during inertia loads takes place, the present invention contemplates the use of bearings having different eccentricities. According to this concept, shown in FIG. 3, a journaled member (30) is surrounded by a bearing composed of one halfshell (20) with a reduced or inexistent eccentricity installed in the connecting rod (10) which is the portion subjected to the expansion and beginning of exhaust loads, and one halfshell (21) with a greater or adequate eccentricity placed in the connecting rod bearing cap which is the portion subjected to the end of exhaust and beginning of intake loads. The amounts of eccentricity of the bearing (21) are a function of the engine design characteristics.

This clearance increase in the direction of closing of the connecting rod big end hole during the inertia loads affords, upon the exertion of peak inertia loads, a reduced heat generation, more favorable conditions for the development of a lubricating oil film, by preventing turbulences therein, and further a lesser amount of energy dissipated in the bearing due to hydrodynamic friction forces or metal-to-metal contact. A halfshell having a reduced or inexistent eccentricity installed in the connecting rod, which is the portion subjected to the expansion and beginning of exhaust loads, affords maintaining lubrication parameters at satisfactory levels.

Figure 2:
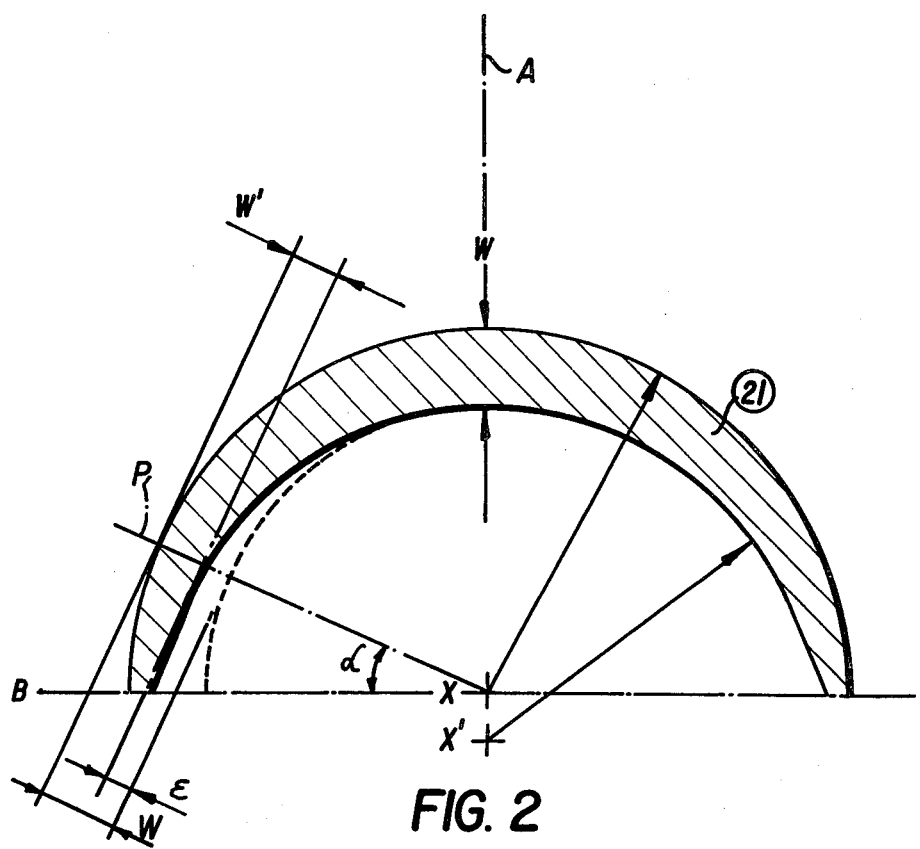
FIG. 2 is a schematic sectional view of the eccentric bearing object of the present invention.

FIG. 2 is an enlarged schematic view of an eccentric bearing half shell (21) according to this invention, to be inserted in the connecting rods bearing the cap. As may be seen in this configuration the generatrix center "x" of the bearing half shell outer surface located at the intersection of center line A and parting line B is not coincidental with the generatrix center x' of the half shell inner surface, the generatrix center x' lying on center line A but outwardly beneath parting line B.

The design shown in FIG. (2) defines a bearing half shell symmetrical to central line A in which thickness W in the portion of the center line A decreased toward the half shell ends located on parting line B by gradually decreasing the value (w') which define corresponding increasing values of inner eccentricity ($\epsilon$) dimensioned to provide a predetermined amount of clearance between the eccentric half shell (21) and crankpin (30) at a given point of the half shell length.

According to the present invention, between the eccentric half shell (21) and crankpin (30) at the point corresponding to the intersection line A, a clearance equal to the clearance between half shell (20) and crank pin (30) is defined. This clearance however, increases in the direction of parting line B.

The eccentricity ($\epsilon$) is measured on a radial line P which defines an angle ordinarily varying between 10°–25° with respect to parting line B and intersects parting line B at the geometric center x thus generating the external surface of eccentric half shell (21). It will be clear to those skilled in the art that, for convenience, the elements of FIG. 3 have been described with respect to two dimensional figures. It will be understood however, that line P, may also be representative of a plane extending into the plane of the drawing and point x and x' for example, will be representative of lines extending into the plane of the drawing. Angle x depends on the journal diameter, so that the smaller the journal diameter the greater the angle and, conversely, the larger the journal diameter the smaller the angle.

The amounts of eccentricity contemplated for the bearing object of this invention are 0.000/0.015 mm for the halfshell (20) to be installed in the connecting rod, and 0.005/0.075 mm for the halfshell (21) to be fitted in the bearing cap.

Figure 3:
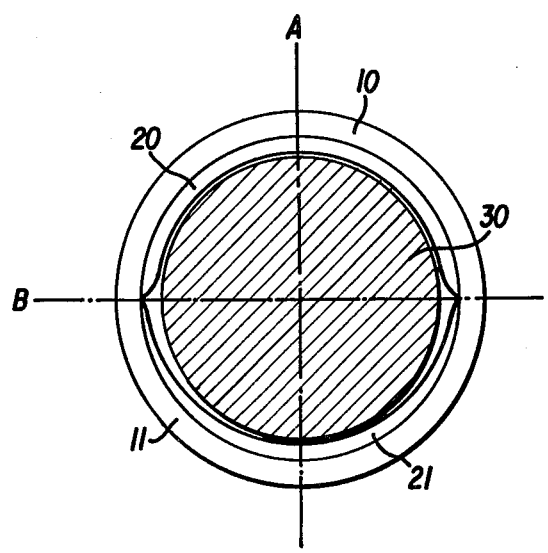
FIG. 3 is a schematic sectional view of the upper and lower halfshells of a connecting rod bearing according to the invention, enclosing a crankpin.

Owing to the distinctive shape taken by the big end hole of the rod fitted with halfshells having different eccentricities, the wall thicknesses at the relief portion of halfshells (20) and (21) next to the parting line B, have to be made compatible in order to prevent a wiping of the oil film. This matching is achieved by machining the reliefs as depicted in FIG. 3.

While the invention has been described for use as a connecting rod bearing as a preferred embodiment, it should be appreciated that its object may be used for other purposes such as crankshaft main bearings. As in such application the inertia loads actuate in a direction opposite to that of the connecting rod, the halfshell (21) would be placed in the corresponding housing in the crankcase, and the halfshell (20) would be fitted in the main bearing cap.

We claim:

1. A sleeve bearing for use with connecting rods, said connecting rods including a main body having a centerline defined along a longitudinal axis of said main body, a first half shell defined at one end of said main body, and a bearing cap having a second half shell therein, said bearing cap being coupled to said first half shell, said first and second half shells being adapted to receive a journal member of a crankshaft therebetween, wherein;

said first half shell has substantially no eccentricity and a substantially constant clearance between said half shell and said journal member; and said second half shell has an inner eccentricity defined to have a clearance from said journal member at said center line substantially equal to said first half shell clearance, said clearance increasing away from said center line.

2. A sleeve bearing as defined in claim 1 wherein said first and second half shells define substantially 180° degrees and, said inner eccentricity of said second half shell being selected from the range of 0.005 to 0.075 millimeter when measured on a radial line which defines an angle from 10° to 25° with respect to intersecting the ends of a said arc of said secured half shell, the eccentricity of said first half shell being selected to be in the range of 0 to 0.05 millimeter.

3. A sleeve bearing according to claim 1 wherein said second half shell is symmetrical to said center line.

4. A sleeve bearing according to claim 2 wherein said second half shell is symmetrical to said center line.

5. A sleeve bearing according to claim 3 wherein an inner surface of said first half shell has a constant radius of curvature.

6. A sleeve bearing as defined in claim 4 wherein an inner surface of said first half shell has a constant radius of curvature.

* * * * *